(12) United States Patent
Rabinovich et al.

(10) Patent No.: US 9,216,400 B2
(45) Date of Patent: Dec. 22, 2015

(54) HIGH POWER NON-THERMAL PLASMA SYSTEM FOR INDUSTRIAL APPLICATIONS

(71) Applicant: DREXEL UNIVERSITY, Philadelphia, PA (US)

(72) Inventors: Alexander Rabinovich, Cherry Hill, NJ (US); Gary Nirenberg, Hainesport, NJ (US); Ivan Chernets, Philadelphia, PA (US); Alexander Fridman, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 61 days.

(21) Appl. No.: 13/933,460

(22) Filed: Jul. 2, 2013

(65) Prior Publication Data
US 2014/0021035 A1    Jan. 23, 2014

Related U.S. Application Data

(60) Provisional application No. 61/672,425, filed on Jul. 17, 2012.

(51) Int. Cl.
| | |
|---|---|
| *B01J 19/08* | (2006.01) |
| *H05H 1/48* | (2006.01) |
| *H05H 1/44* | (2006.01) |

(52) U.S. Cl.
CPC ............... *B01J 19/08* (2013.01); *B01J 19/088* (2013.01); *H05H 1/44* (2013.01); *H05H 1/48* (2013.01);
(Continued)

(58) Field of Classification Search
CPC .. B01J 19/088; B01J 19/08; B01J 2219/0809; B01J 2219/0839; B01J 2219/0841; B01J 2219/0869; B01J 2219/0875; B01J 2219/0877; B01J 2219/0879; B01J 2219/0896; H05H 1/48; H05H 1/44
See application file for complete search history.

(56) References Cited

U.S. PATENT DOCUMENTS

| | | | |
|---|---|---|---|
| 5,340,450 A | | 8/1994 | Griffiths et al. |
| 6,099,696 A | * | 8/2000 | Schwob et al. ............... 204/173 |

(Continued)

FOREIGN PATENT DOCUMENTS

WO    WO 2006-049566    5/2006

OTHER PUBLICATIONS

Anshakov et al, "Plasma-Arc Reactor for Processing of Powder Materials", Beam and Plasma Nanoscience and Nanotechnology, Oral Session, 2010, Gas, 2, 16, 717-719.

(Continued)

*Primary Examiner* — Kishor Mayekar
(74) *Attorney, Agent, or Firm* — Baker & Hostetler LLP

(57) ABSTRACT

Methods of increasing the total power of non-thermal plasma power systems are described. Various embodiments of the present invention provide non-thermal plasma reactor assemblies and methods of operating said assemblies, each assembly comprising: (a) at least two non-thermal plasma reactors, each reactor comprising at least one inlet circumferential gas flow inlet apparatus, an electrode, and a flow restricted exit portal, said reactor configured to eject a jet of non-thermal plasma external to said reactor; (b) said at least two non-thermal plasma reactors configured to work in tandem with one another such that a first reactor electrode can be maintained at a high voltage electric potential relative to a second reactor electrode, said first and second reactor electrodes forming an electrode pair able to maintain a non-thermal plasma discharge between the first and second reactor electrodes.

32 Claims, 12 Drawing Sheets

(52) U.S. Cl.
CPC ... *B01J 2219/0809* (2013.01); *B01J 2219/0839* (2013.01); *B01J 2219/0841* (2013.01); *B01J 2219/0869* (2013.01); *B01J 2219/0875* (2013.01); *B01J 2219/0877* (2013.01); *B01J 2219/0879* (2013.01); *B01J 2219/0896* (2013.01)

(56) References Cited

U.S. PATENT DOCUMENTS 7,452,513 B2 * 11/2008 Matveev ............. 422/186
8,361,404 B2 * 1/2013 Gutsol et al. ............. 422/186.21
2010/0065781 A1 * 3/2010 Brothier ................. 252/373

OTHER PUBLICATIONS

Osipova et al, "Dual-Jet Plasmatron for Medical Applications", Journal of Applied Spectroscopy, 2007, 74(1), 156-158.

Tashtanov et al, "Parameter Optimization of an Improved Two-Jet Plasmatron for Analyzing Powder Samples", Journal of Analytical Chemistry, 2006, 61(6), 576-581.

Yudelevich, "A Two-Jet Plasmatron for the Spectrochemical Analysis of Geological Samples", Spectrochimica Acta, 1984, 39B(6), 777-785.

* cited by examiner

M1 ... M6      - Power Modules;
D1 ... D6      - Switching Diodes;

HIGH POWER NON-THERMAL PLASMA SYSTEM FOR INDUSTRIAL APPLICATIONS

CROSS REFERENCE TO RELATED APPLICATIONS

This application claims priority to U.S. Application No. 61/672,425, filed Jul. 17, 2012, which is incorporated herein by reference in its entirety.

TECHNICAL FIELD

This disclosure is in the field of non-thermal plasma apparatuses and their operation and use in chemical conversions.

BACKGROUND

Non-equilibrium plasmas, including gliding arc plasmas, operating at low power levels (0.5-1 kW) are highly efficient plasma stimulators of hydrogen/syngas generation from biomass, coal and organic wastes. Their advantages over conventional catalytic technology are due to their ability to convert almost any hydrocarbons (without sensitivity to specifics of the feedstock) to syngas without a catalyst, at low temperature, with no thermal inertia, and no sulfur restrictions. Large scale application and commercialization of this technology typically requires scaling-up of the non-equilibrium plasma to a single unit power of 10-30 kW, which corresponds to $H_2$/syngas production on the power level up to 1-3 MW (taking into account that plasma energy consumption is 1-2% of fuel heating value).

At the same time, a limiting factor for industry in applying a non-thermal plasma, in particular gliding arc, is the low associated power level (usually up to only about 1 kW). This is mainly due to the unique properties of gliding arc; that is, the high voltages (1-3 kV) and low currents (1-10 A) associated with this technology. If the current increases to the higher level, the gliding arc loses its non-equilibrium properties and becomes a regular thermal arc. The possibility of achieving a significant power increase by increasing arc voltage is also problematic, due to substantial technical difficulties.

The present invention seeks to address at least some of these challenges.

SUMMARY

The present invention describes non-thermal reactors and assemblies, and their use as reactors for the conversion of feedstocks. The invention also provides for modular power supplies which may be used with such reactors and assemblies.

Various embodiments of the present invention provide non-thermal plasma reactor assemblies, each assembly comprising: (a) at least two non-thermal plasma reactors, each reactor comprising at least one inlet circumferential gas flow inlet apparatus, an electrode, and a flow restricted exit portal, said reactor configured to eject a jet of non-thermal plasma external to said reactor; (b) said at least two non-thermal plasma reactors configured to work in tandem with one another such that a first reactor electrode can be maintained at a high voltage electric potential relative to a second reactor electrode, said first and second reactor electrodes forming an electrode pair able to maintain a non-thermal plasma discharge between the first and second reactor electrodes. In certain of these embodiments, each reactor further comprises an ignition electrode. In other embodiments, the flow restricted exit portal of each reactor is configured to act as an ignition electrode. In other embodiments, additional like-configured reactors are connected in series between the first and second reactors.

Other embodiments provide non-thermal plasma reactor assemblies, each assembly comprising: (a) an electrically grounded central reaction chamber having at least one inlet for feedstock and at least one outlet for product; (b) a first and second reactor, each electrically insulated from the central reaction chamber, each reactor comprising: (i) an electrode; (ii) at least one circumferential inlet gas flow apparatus connected in fluidic communication to said first reactor; and (iii) a flow restricted exit portal; the at least one inlet circumferential flow apparatus and flow restricted exit portal of the first reactor configured to provide mixing of a gas within the first reactor upon introduction of said gas through the at least one circumferential inlet gas flow apparatus into said first reactor; and the at least one inlet circumferential flow apparatus and flow restricted exit portal of the second reactor configured to provide mixing of a gas within the second reactor upon introduction of said gas through the at least one circumferential inlet gas flow apparatus into said second reactor; wherein the flow restricted exit portal of each reactor is connected in fluidic communication with the central reaction chamber; wherein electrodes of the first and second reactors are configured as a first and second electrode, respectively, so as to sustain a high voltage electrical potential between the first and second electrodes; and wherein the non-thermal plasma reactor is configured to sustain a non-thermal plasma between the first and second electrodes when ignited. In certain of these embodiments, each reactor further comprises an ignition electrode. In other embodiments, the flow restricted exit portal of each reactor is adapted to act as an ignition electrode.

In still other embodiments, additional reactors may be employed in the assembly, each additional reactor being electrically insulated from the central reaction chamber, said first reactor having (i) an electrode; (ii) at least one circumferential inlet gas flow apparatus connected in fluidic communication with said additional reactor and (iii) a flow restricted exit portal; the inlet circumferential flow apparatus and flow restricted exit portal configured to provide mixing of a gas within the additional reactor upon introduction of said gas through the at least one circumferential inlet gas flow apparatus into said additional reactor; and wherein the flow restricted exit portal of the additional reactor is connected in fluidic communication with the central reaction chamber; and wherein the electrode of each additional reactor is configured to be operable in electrical series between the first and second electrodes. In certain of these embodiments, each reactor further comprises an ignition electrode. In other embodiments, the flow restricted exit portal of each reactor is adapted to act as an ignition electrode.

Other embodiments provide reactor assemblies, each assembly further comprising an apparatus for applying a voltage difference between said first and second reactor electrodes. Still other embodiments provide reactor assemblies, each assembly further comprising a power supply comprising: (a) at least two power supply modules, each module adapted to independently deliver power in a range of about 0.5 kW to about 10 kW; (b) a microprocessor unit which independently addresses and controls the energy output of each power supply module, in order to provide a predetermined duty cycle for the power supply; said power supply configured to maintain an overall delivered power to sustain a non-thermal plasma within the reactor assembly, with an associated current in a range of about 0.5 amps to about 30 amps.

Still other embodiments provide methods of operating the non-thermal plasma reactor assembly, each method comprising: (a) independently providing a gas to at least one of the first or second reactors; and (b) applying a high voltage electrical potential across the first and second reactor electrodes; such that a non-thermal plasma is present.

The invention also provides methods of operating the non-thermal plasma reactor assemblies described herein, each method comprising: (a) independently providing a gas to each of the first or second reactors; and (b) applying a high voltage electrical potential across the first and second reactor electrodes; such that a non-thermal plasma is present. Further embodiments provide for further contacting the non-thermal plasma to a feedstock.

Still other embodiments provide methods of catalyzing chemical reactions in a feedstock using a non-thermal plasma reactor assembly, each method comprising: using at least two non-thermal plasma reactors, each reactor comprising an electrode and configured to eject a jet of non-thermal plasma having an operating power external to said reactor; said at least two non-thermal plasma reactors configured to work in tandem with one another such that a first reactor electrode can be maintained at a high voltage electric potential relative to a second reactor electrode, said first and second reactor electrodes forming an electrode pair configured to maintain a non-thermal plasma discharge between the first and second reactor electrodes; said method comprising: (a) independently providing a gas to each the first or second reactors; and (b) applying a high voltage electrical potential across the first and second reactor electrodes; such that a non-thermal plasma is maintained and contacts the feedstock.

BRIEF DESCRIPTION OF THE DRAWINGS

The present application is further understood when read in conjunction with the appended drawings. For the purpose of illustrating the subject matter, exemplary embodiments of the subject matter are shown in the drawings; however, the presently disclosed subject matter is not limited to the specific methods, devices, and systems disclosed. In addition, the drawings are not necessarily drawn to scale. In the drawings:

FIG. 1 is a schematic of a double jet gliding arc plasma system. FIG. 2 illustrates a plasma assembly for fuel reforming FIG. 3 illustrates a serial connection for four gliding arc reactors in one plasma reactor assembly FIG. 4 provides a schematic representation of the time operation of a modular power supply of the present invention.

DETAILED DESCRIPTION OF ILLUSTRATIVE EMBODIMENTS

Figure 1:
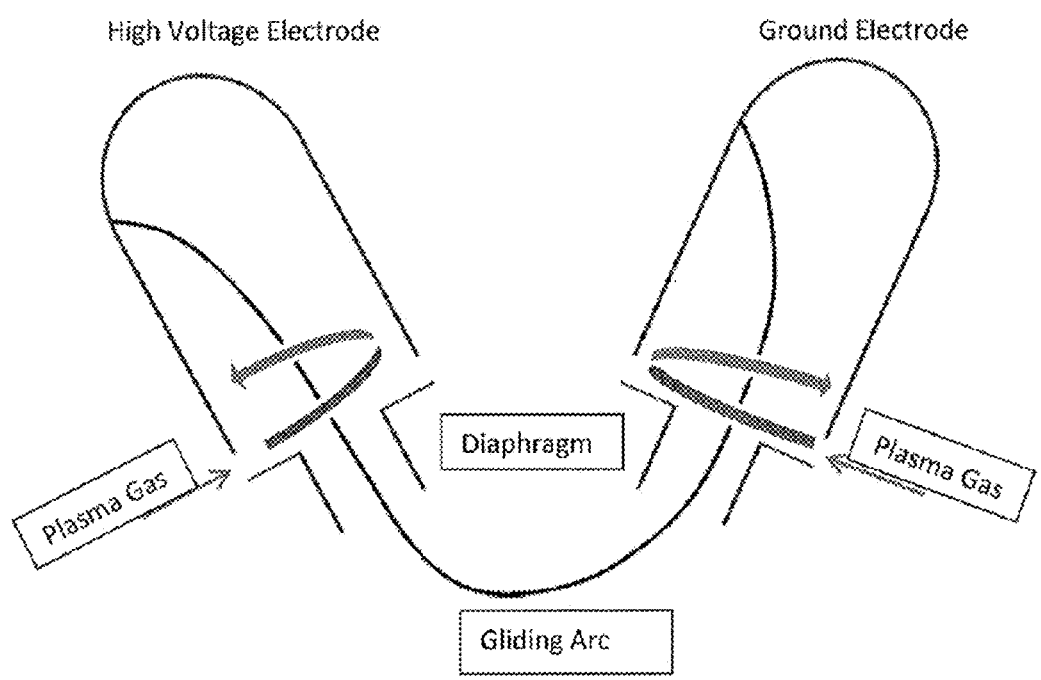
FIGS. 1-3 provides schematic representations of several embodied layouts of reactor assemblies of the present invention.

The present invention may be understood more readily by reference to the following description taken in connection with the accompanying Figures and Examples, all of which form a part of this disclosure, and each of which is an embodiment thereof. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods of operating a device and systems and to the devices and systems providing said methods. That is, where the disclosure describes and/or claims a method or methods for operating a flow battery, it is appreciated that these descriptions and/or claims also describe and/or claim the devices, equipment, or systems for accomplishing these methods.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself.

Throughout this specification, words are to be afforded their normal meaning, as would be understood by those skilled the relevant art. However, so as to avoid misunderstanding, the meanings of certain terms will be specifically defined or clarified. For example, as used herein, the term "non-thermal plasma reactor" includes "gliding arc plasmatron" or "plasmatron," and non-thermal plasma reactor assemblies include "double" or "multi-jet" "plasmatrons." Also, the term "non-thermal plasma" includes "gliding arc plasma;" where the more general term "non-thermal plasma" is used, a "gliding arc plasma" represents a separate embodiment.

Methods of increasing the total power of non-thermal plasma power systems are described herein. Various embodiments of the present invention provide non-thermal plasma reactor assemblies, each assembly comprising: (a) at least two non-thermal plasma reactors, each reactor comprising at least one inlet circumferential gas flow inlet apparatus, an electrode, and a flow restricted exit portal, said reactor configured to eject a jet of non-thermal plasma external to said reactor; (b) said at least two non-thermal plasma reactors configured to work in tandem with one another such that a first reactor electrode can be maintained at a high voltage electric potential relative to a second reactor electrode, said first and second reactor electrodes forming an electrode pair configured to maintain a non-thermal plasma discharge between the first and second reactor electrodes. In certain of these embodiments, each reactor further comprises an ignition electrode ("igniter"). In other embodiments, the flow restricted exit portal of each reactor is adapted to act as an ignition electrode. In other embodiments, additional like-configured reactors are connected in series between the first and second reactors.

In other embodiments, non-thermal plasma reactor assemblies each comprise: (a) an electrically grounded central reaction chamber having at least one inlet for feedstock and at least one outlet for product; (b) a first and second reactor, each electrically insulated from the central reaction chamber, each reactor comprising: (i) an electrode; (ii) at least one circumferential inlet gas flow apparatus connected in fluidic communication to said first reactor; and (iii) a flow restricted exit portal; the at least one inlet circumferential flow apparatus and flow restricted exit portal of the first reactor configured to provide mixing of a gas within the first reactor upon introduction of said gas through the at least one circumferential inlet gas flow apparatus into said first reactor; and the at least one inlet circumferential flow apparatus and flow restricted exit portal of the second reactor configured to provide mixing of a gas within the second reactor upon introduction of said gas through the at least one circumferential inlet gas flow apparatus into said second reactor; wherein the flow restricted exit portal of each reactor is connected in fluidic communication with the central reaction chamber; wherein electrodes of the first and second reactors are configured as a first and second electrode, respectively, so as to sustain a high voltage electrical potential between the first and second electrodes; and wherein the non-thermal plasma reactor is configured to sustain a non-thermal plasma between the first and second electrodes when energized. That is, the reactor assemblies may, but do not necessarily, include a central reaction chamber. The further descriptions herein apply to both circumstances. In certain of these embodiments, each reactor further comprises an ignition electrode. In other embodiments, the flow restricted exit portal of each reactor is adapted to act as an ignition electrode.

When operating, such reactor assemblies may further comprise (a) a gas flow into each of the first or second reactor through the respective at least one circumferential inlet gas flow apparatus; (b) a high voltage potential applied across the first and second electrode; and (c) a non-thermal plasma within the central reaction chamber.

Before considering the tandem operation of the reactors in the reactor assemblies, it is helpful to consider certain features of the individual non-thermal plasma reactors (optionally described herein as "plasmatrons"). For example, in certain embodiments, the reactor assemblies comprise reactors, wherein at least one reactor is configured with at least one circumferential (tangential) inlet gas flow apparatus oriented tangentially relative to a sidewall of the corresponding reactor and connected in fluidic communication to each reactor; for example, see FIGS. 1, 2, and 7. These circumferential inlet gas flow apparatuses (which may include pipes, slits, nozzles, or other fluidic communication devices as known in the art) allow for the introduction of gases to be used in the development of non-thermal plasmas, such as oxygen, air, hydrogen, light hydrocarbons (such as methane), neutral gases (e.g., nitrogen, argon), or a combination thereof and form part of the reactor configuration providing for a vortex flow of the incoming gases. The term "vortex flow" is understood by those skilled in the art. It should be appreciated that the inlet gas(es) of each individual reactor may be the same or different from any other reactor.

Figure 2:
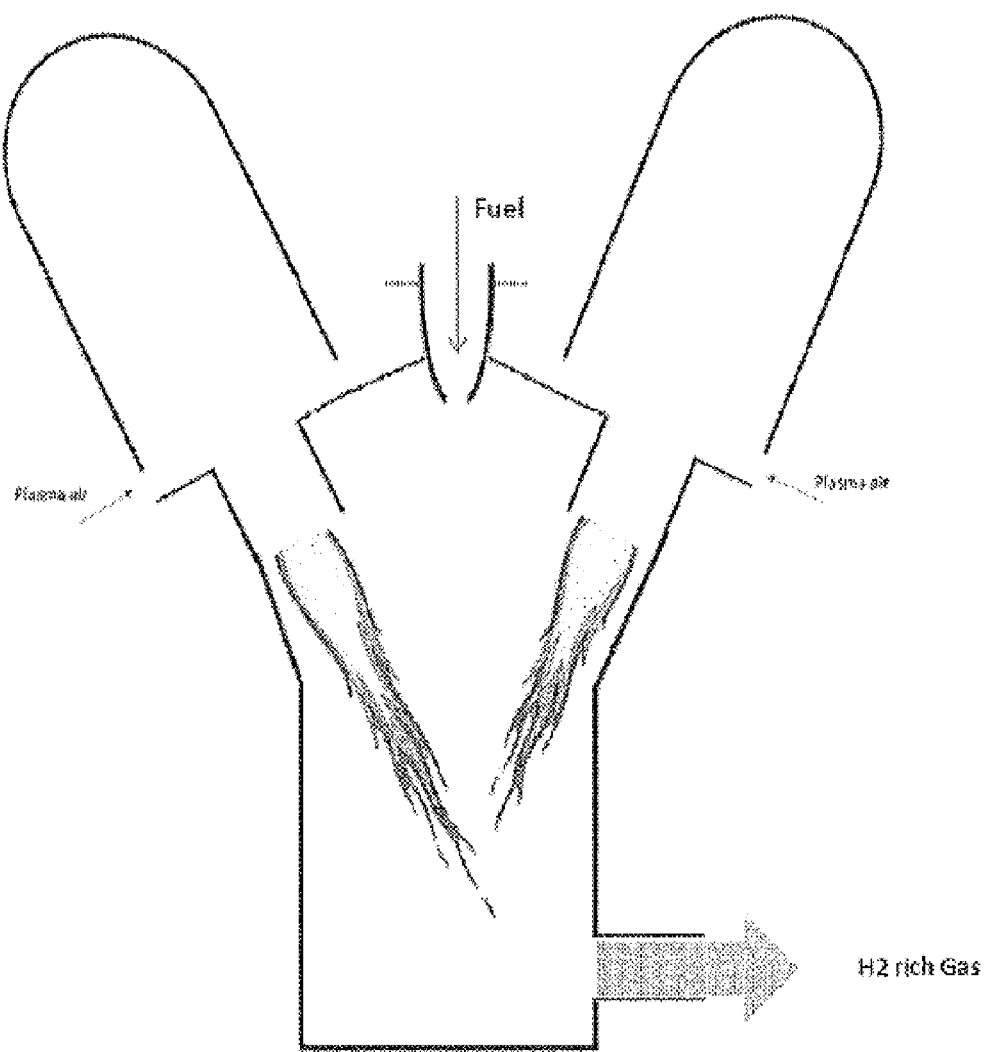
Figure 3:
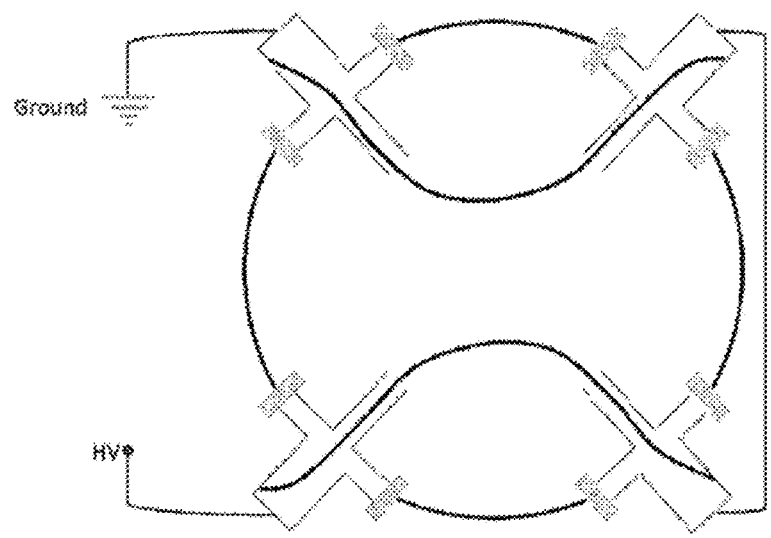
Figure 7:
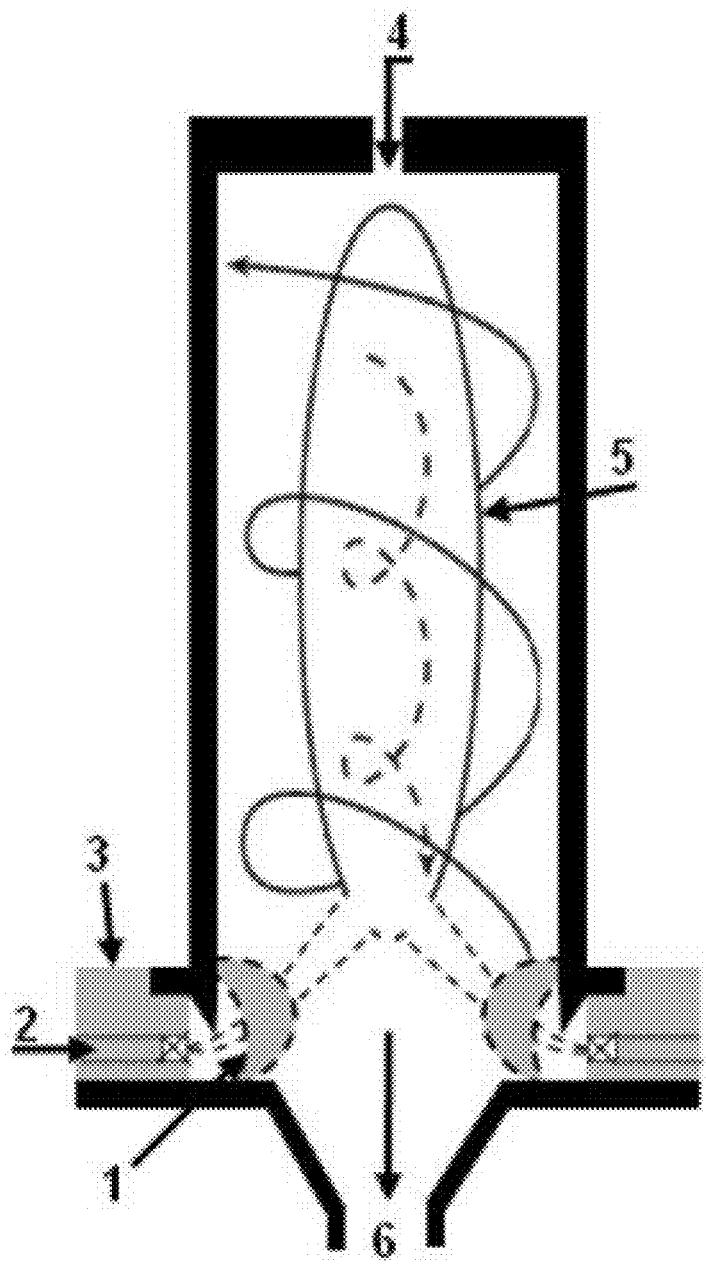
FIG. 7 illustrates a reverse vortex flow pattern within one of the reactors of a reactor assembly of the present invention, prior to tandem operation of multiple reactors. As illustrated in this figure, element 1 represents a gliding arc; element 2 refers to the circumferential (tangential channel); element 3 refers to an electric insulator; element 4 illustrates an axial injection of additional gas or fuel; element 5 illustrates a plasma zone; and element 6 illustrates the flow restricted exit portal of the reactor.

While FIGS. 1, 2, and 7 show the circumferential inlet gas flow apparatus proximate to the flow restricted exit portal (or "diaphragm"), the invention is not so limited, and the reactors may be configured so as to comprise multiple circumferential inlet gas flow apparatuses at varying distances from the flow restricted exit portal, including the end of the reactor distal from the flow restricted exit portal. It should be appreciated, however, that the combination of the flow restricted exit portal (or "diaphragm") and the positioning of the circumferential inlet gas flow apparatus proximate thereto, forms part of a reactor configuration wherein the vortex flow is a reverse vortex flow. Reverse vortex flow connotes a vortex flow that has an axial contribution of motion away from the flow restricted exit portal, and is understood by those skilled in the art. The advantages of vortex, and especially reverse vortex, flow in non-thermal plasma design (for example in enhancing mixing and residence time within the reactor) are also well known to those skilled in the art. Additionally, in the case of a gliding arc plasma, the reverse vortex stimulates rotational motion of the gliding arc roots and simultaneously decreases the heat losses to electrode(s).

In certain other embodiments, at least one reactor may comprise an axial inlet gas or liquid flow apparatus, such as illustrated in element 4 of FIG. 7. Such an axial inlet may be useful, for example, in promoting or controlling the ejection of the plasma jet from the associated reactor or in injecting liquid or gaseous hydrocarbons for reforming.

In part, because of the low temperatures associated with non-thermal plasma chemistries, the electrodes of the present invention may comprise stainless steel, copper or carbon (e.g., graphite). The ability to use such electrode materials provides a significant advantage compared to thermal plasma generators, that due to high current require water cooled copper electrodes.

Returning to the reactor assemblies, the term "in tandem" refers to a configuration in which the two or more non-thermal plasma reactors (plasmatrons) may be viewed as being connected in series, when operating, by a non-thermal plasma which discharges between a first electrode (operating at high voltage) and second reactor electrode (operating at a lower voltage; e.g., acting as a ground electrode). One such non-limiting example of such an assembly is shown in FIG. 1. Similarly, the term "capable of sustaining, or "configured to sustain," a high voltage electrical potential between the first and second electrodes" and "capable of sustaining, or "configured to sustain," a non-thermal plasma between the first and second electrodes when energized is intended to reflect that the electrodes are oriented and sufficiently proximate to one another and having sufficient electrical character (including insulation from other elements of the assembly) so as to sustain a non-thermal plasma between the two electrodes when operating.

Using the same principle for scaling up power, for each of the assemblies already described, additional non-thermal plasma reactors (or plasmatrons), similarly configured may be included, so as to provide a non-thermal plasma which passes in series between first and second reactors, by way of the additional reactors. For example, certain additional embodiments provide reactor assemblies as described above, each further comprising at least one additional reactor, each additional reactor being electrically insulated from the central reaction chamber (where previous embodiments describe such a central reaction chamber), said first reactor comprising an electrode and having (i) at least one circumferential inlet gas flow apparatus connected in fluidic communication with said additional reactor and (ii) a flow restricted exit portal; the inlet circumferential flow apparatus and flow restricted exit portal configured to be provide mixing of a gas within the additional reactor upon introduction of said gas through the at least one circumferential inlet gas flow apparatus into said additional reactor; and wherein the flow restricted exit portal of the additional reactor is connected in fluidic communication with the central reaction chamber; and wherein the electrode configured to be operable in electrical series between the first and second electrodes.

Figure 4:
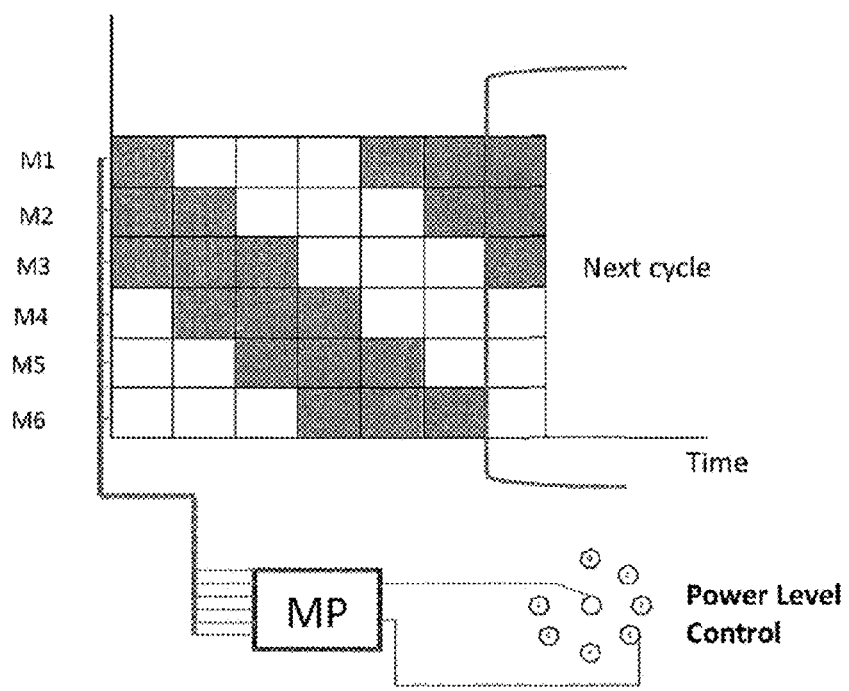

In one non-limiting illustrative example, FIG. 4 shows a serial connection of four non-thermal plasma reactors (in this case, gliding arc plasmatrons) operating on a single plasma reactor assembly. By combining two (or more) non-thermal plasma reactors (e.g., gliding arc plasmatrons) into one double jet plasmatron with a joint arc, as described herein, the operator is able to increase the total power of the plasma system, without an associated increase in current (e.g., while keeping the current the same as used in the operation of each individual reactor).

While the individual reactor assembly in FIG. 4 is shown to be oriented in a two-dimensional arrangement, 90° from one another, respectively, it should be appreciated that the invention is not necessarily limited to any particular reactor orientation (with respect to one another), as long as the orientation allows for the connection or crossover of the plasma jets generated by each of the individual reactors. The specific relative spatial orientations of the reactors will depend on gas flows and number and size of the individual reactors, the size of the central chamber (where used), and the nature of the feedstocks and products.

The reactors of the embodied reactor flow assemblies described heretofore comprise at least one electrode, which provides for the maintenance of a "shared" non-thermal plasma once such a plasma is initiated. However, additional reactor configurations include those wherein each reactor further comprises a second electrode which is adapted to act as an ignition electrode, for use during start-up of each individual plasma reactor. Within a given reactor, the ignition electrode is separated from the reactor electrode by an insulative gap, adapted to allow for developing a high voltage difference between the reactor and ignition electrodes. The purpose of each ignition electrode is to initiate plasma discharge during start-up of the system. In some embodiments, the flow restricted exit portal (which may also be referred to as a "diaphragm") of each reactor is adapted to act as such an ignition electrode. Other ignition configurations, known in the art, may also be used with these reactor assemblies.

In one exemplary start-up procedure, each reactor is charged with a plasma gas (described below), and the electrode and igniter electrode of each reactor is energized to provide a breakdown through the gap, such that the breakdown initiates the formation of a gliding arc, or other non-thermal, plasma within that reactor. Each reactor may be energized at the same time or at different times from any other reactor (see also the Example below and FIG. 8). The configuration of the reactor provides that the non-thermal plasma so generated forms a non-thermal plasma jet exiting each reactor through its associated flow restricted exit portal. The configuration of the reactor assembly further provides that the two (or more) reactors are configured, such that, when operating, the jets exiting the two (or more) reactors "connect," or overlap, to a "common volume" of plasma external to each reactor. When the overlapping portions of the plasma jet of the reactor are occupying the common volume, then, by virtue of the nature of the plasma jets, there is electrical communication between the electrodes in each reactor, able to sustain a non-thermal plasma.

For those embodiments wherein the reactor assembly comprises an electrically grounded central reaction chamber having at least one inlet for feedstock, independent embodiments provide that the feedstock inlet be configured to accept solid, liquid, gaseous feedstocks, or any combination thereof. These feedstocks may include coal, municipal wastes or biomass, where the feedstock is solid; hydrocarbon liquid waste or liquid fuel, where the feedstock is liquid; and natural gas, carbon dioxide, hydrogen sulfide, where the feedstock is gaseous. It is expected that the ordinary skilled artisan would be able to appreciate the different materials and fitting/seals necessary for each of these types of feedstocks.

For those embodiments wherein the reactor assembly comprises an electrically grounded central reaction chamber having at least one outlet for product, independent embodiments provide that the at least one product outlet be configured to allow for the passage of unreacted feedstock, as well as liquid or gaseous product, for example including synthesis gas (comprising hydrogen, and/or carbon monoxide), carbon dioxide, nitrogen, light hydrocarbons, or a mixture thereof. Again, it is expected that the ordinary skilled artisan would be able to appreciate the different materials and fitting/seals necessary to accommodate each of these types of materials.

Further embodiments provide that the reactor assemblies described herein further comprise an apparatus for applying a voltage difference between said first and second reactor electrodes. The reactor assemblies described herein may also be characterized by the high voltage electrical potential applied across the first and second reactor electrodes, the associated current, and the plasma output power within the common volume described above.

As used herein, the term "high voltage" refers to a voltage or potential in the kilovolt (e.g., 1-100 kV) range. In certain of these embodiments, the high voltage electrical potential applied or able to be applied across the first and second reactor electrodes is in a range of 1-20 kV. Independent embodiments include those where the high voltage electrical potential is in a range, having a lower end boundary of about 1, about 2, about 3, about 5, or about 5 kV, and an independent upper end boundary of about 20, about 18, about 16, about 14, about 12, about 10, about 9, about 8, about 7, about 6, or about 5 kV. Illustrative exemplary, non-limiting ranges include those of about 1 to 5 kV, about 1 to about 10 kV, and about 2 to about 20 kV.

In other embodiments, the current associated current with the non-thermal plasma is in a range of about 0.1 to about 30 A (consistent with the non-thermal nature of the associated plasma). Independent embodiments include those where the associated current is in a range having a lower end boundary of about 0.1, about 0.5, about 1, about 2, about 3, about 4, or about 5 amps, and an independent upper end boundary of about 30, about 25, about 20, about 15, about 10, about 5, about 4, about 3, about 2, about 1, about 0.5, or about 0.1 A. Exemplary, non-limiting ranges include those of about 0.1 to 30 amps, about 0.1 to about 20 amps, about 1 to about 10 amps, and about 1 to about 5 amps.

In further independent embodiments, the plasma output power within the common volume described above is in a range of about 1 kilowatt to about 500 kilowatts. Independent embodiments include those where this power is in a range, having a lower end boundary of about 1, about 5, about 10, about 50, about 150, about 200, or about 250 kW, and an independent upper end boundary of about 500, about 400, about 300, about 200, about 100, or about 50 kW. Exemplary, non-limiting ranges include those of about 1 to 300 kW, about 10 to about 300 kW, about 10 to about 200 kW, and about 50 to about 250 kW.

It should be appreciated that the output power within the common volume is greater than a plasma output power of any individual reactor by a multiple, for example, greater than about 1 or about 2. As such, this common volume may be described as a region of enhanced plasma power, or an enhanced non-thermal plasma.

Relatedly, in certain embodiments, the outlet power within the common volume is sufficient to provide conversion of hydrocarbon fuel to syngas, dissociation of carbon dioxide to carbon monoxide and oxygen, or dissociation of hydrogen sulfide to hydrogen and sulfur.

Certain embodiments of the present invention also provide for the incorporation of a specially developed power supply as part of the reactor assemblies and for their use to drive the reactors assemblies described herein. These power supplies overcome some of the limitations of existing power supplies. In particular, the inventive power supplies provide for the efficient delivery of sufficient current to maintain the chemical reforming processes. It should be appreciated that, while described in the context of the inventive reactors, embodiments of the power supplies are considered separate inventions of the present disclosure, independent of the reactors.

Suitable power supplies can use a 'switch mode transformer,' comprising a plurality of modules, based on Pulse-width modulation (PWM), or pulse-duration modulation (PDM), technology. PWM and PDM can be used for controlling power to inertial electrical devices, made practical by modern high frequency electronic power switches. The average value of voltage or current fed to the load is controlled by turning the internal electronic power switch on and off at a fast pace. The longer the switch is on compared to the off periods, the higher the power supplied to the plasma load is. The main advantage of PWM is that power loss in the switching devices is very low. When a switch is off there is practically no current, and when it is on, there is almost no voltage drop across the switch. Power loss, being the product of voltage and current, is thus in both cases close to zero. To maintain required plasma power, multiple individual power modules are used, each module limited in its output power potential. Microprocessor controls power to turn on particular number of modules work at every moment of time.

The term duty cycle describes the proportion of 'on' time to the regular interval or 'period' of time; a low duty cycle corresponds to low power, because the power is off for most of the time. Duty cycle is expressed in percent, 100% being fully on. FIG. 4 shows a schematic of a time diagram for an exemplary modular system of the present invention, here using 6 power supply modules. Herein, each module is current controlled. Duty cycle of each module depends on position of power level control (FIG. 4). Microprocessor (MP) analyzes a signal from the power level control and calculates time and sequence of operation of each module. For example, the shaded area at every moment of time on FIG. 4 shows the operational time of 3 modules corresponding to position 3 of power level control.

Despite the illustration in FIG. 4, it should be appreciated that the invention is not limited to 6 modules or to any particular duty cycle. Various individual embodiments encompass a number of modules of at least 2, 4, 6, 8, or 10 power modules and up to about 10, 15, 20, 25, or 50 power modules. The preferred number will depend, in part, on the power capacity of each module and the amount of total output power required. In various embodiments herein, the individual modules are each independently capable of providing, or adapted to provide, power in a range of about 0.5 kW to about 1 kW, about 5 kW, or about 10 kW.

Figure 5:
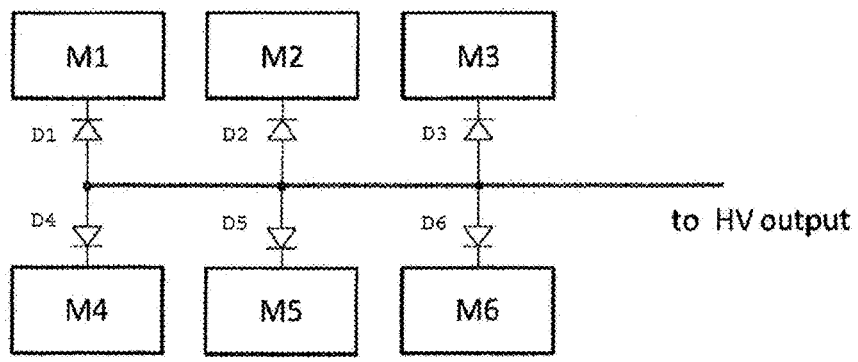
FIG. 5 provides a schematic output circuit with switching diodes.
Figure 5A:
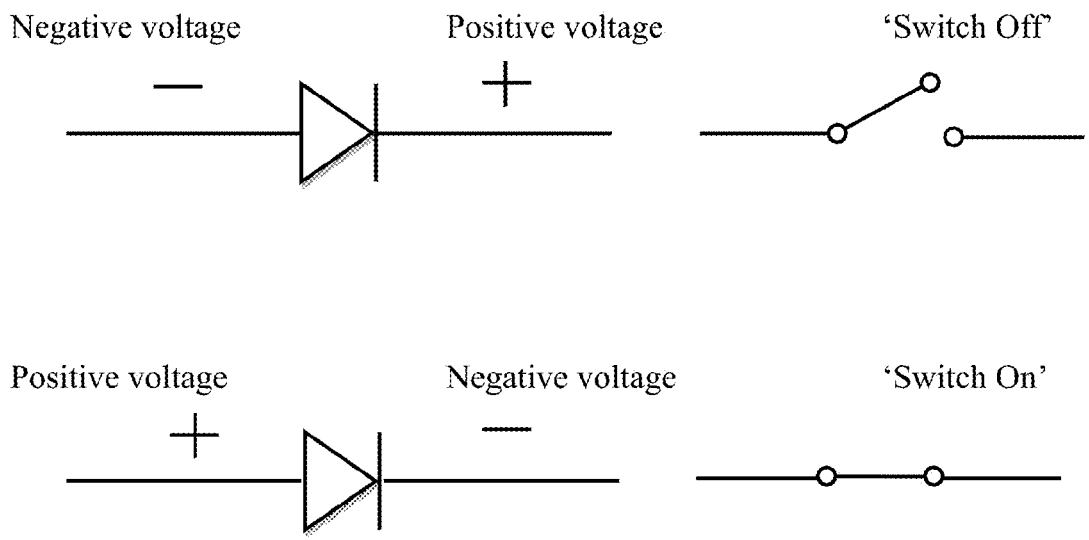
FIG. 5A provides a schematic representation of the switching diode principle.

Output current from each module is switching automatically by high voltage high speed diodes (e.g., FIG. 5). At the same time the switching diodes protect modules from high voltage ignition electrode (FIG. 5A). The average current fed to plasma reactor depends on number of modules operating at any/every moment of time and the microprocessor keeps the duty cycle of each module equal, so as to provide a predetermined power level to said reactor assemblies. The PWM switching frequency has to be much faster than the frequency of the gliding arc in order to be able to control its characteristics. In the present embodiments, switching speeds may be controlled in a range of about 1 kHz to about 1000 kHz. In theory, the average value of voltage (and current) fed to the load can be controlled by turning the switch between supply and load on and off at a fast pace. The longer the switch is on compared to the off periods, the higher the power supplied to the load. However, because of the high frequency of the switching required in the present case, such switching is controlled by a microprocessor adapted to control the duty cycles of the individual modules, based on feedback from the reactor assembly loads, so as to provide a predetermined current and power to said reactor assemblies.

In other embodiments, at least two power supply modules may be employed, each module capable of independently delivering power in a range of about 0.5 kW to about 10 kW; when so employed, a microprocessor unit which independently addresses and controls the energy output of each power supply module may be used so as to maintain a substantially equal duty cycle for each power supply module; said power supply configured to maintain an overall delivered power to sustain a non-thermal plasma within the reactor assembly while switching the modules in a predetermined order. In such embodiments, the power supply may further comprise high voltage switching diodes, capable of switching each operational duty cycle in a predetermined order. Additional embodiments provide that, in such cases, the switching frequency of each module is maintained in a range of about 1 to about 1000 kHz, but not less than the gliding arc frequency.

To this point, the various embodiment have been described mainly in terms of non-thermal reactor assemblies. It should be appreciated that, where possible, the descriptions should be read as including the assemblies as operating, or capable of operating, such assemblies. For example, the invention includes methods of independently operating each and every one of the non-thermal plasma reactor assemblies described herein, wherein such methods comprise: (a) independently providing a gas to at least one of the first or second reactors; and (b) applying a high voltage electrical potential across the first and second reactor electrodes; such that a non-thermal plasma is present, including a region of enhanced plasma power. These embodiments also further comprise the start-up procedures described herein which include the initiation of plasma discharge between high voltage electrode and ignition electrode of at least one of the reactors associated with a reactor assembly, as described above. Further embodiments provide for further contacting a feedstock with the non-thermal plasma.

Further embodiments provide for conversion of hydrocarbon fuel to syngas, the dissociation of carbon dioxide to carbon monoxide and oxygen, and/or the dissociation of hydrogen sulfide to hydrogen and sulfur comprising contacting the appropriate feedstock with the plasma generated by the plasmas generated by the plasma reactor assemblies described herein.

Still other embodiments provide methods of catalyzing chemical reactions in a feedstock using a non-thermal plasma reactor assembly, each method comprising: using at least two non-thermal plasma reactors, each reactor comprising an electrode and configured to eject a jet of non-thermal plasma having an operating power external to said reactor; said at least two non-thermal plasma reactors configured to work in tandem with one another such that a first reactor electrode can be maintained at a high voltage electric potential relative to a second reactor electrode, said first and second reactor electrodes forming an electrode pair configured to maintain a non-thermal plasma discharge between the first and second reactor electrodes; said method comprising: (a) independently providing a gas to each the first or second reactors; and (b) applying a high voltage electrical potential across the first and second reactor electrodes; such that a non-thermal plasma is maintained and contacts the feedstock. In preferred embodiments, the enhanced power plasma contacts the feedstock. In such methods, the chemical reaction includes the conversion of hydrocarbon fuel to syngas, the dissociation of carbon dioxide to carbon monoxide and oxygen, and/or the dissociation of hydrogen sulfide to hydrogen and sulfur.

Among the many embodiments considered within the scope of the present invention are these:

Embodiment 1

A non-thermal plasma reactor assembly comprising: at least two non-thermal plasma reactors, each reactor comprising at least one inlet circumferential gas flow inlet apparatus, an electrode, and a flow restricted exit portal, said reactor configured to eject a jet of non-thermal plasma external to said reactor; said at least two non-thermal plasma reactors configured to work in tandem with one another such that a first reactor electrode can be maintained at a high voltage electric potential relative to a second reactor electrode, said first and second reactor electrodes forming an electrode pair capable of maintaining a non-thermal plasma discharge between the first and second reactor electrodes.

Embodiment 2

A non-thermal plasma reactor assembly, comprising: (a) an electrically grounded central reaction chamber having at least one inlet for feedstock and at least one outlet for product; (b) a first and second reactor, each electrically insulated from the central reaction chamber, each reactor comprising: (i) an electrode; (ii) at least one circumferential inlet gas flow apparatus; and (iii) a flow restricted exit portal; the at least one inlet circumferential flow apparatus and flow restricted exit portal of the first reactor configured to mix a first gas within the first reactor upon introduction of said first gas through the at least one circumferential inlet gas flow apparatus into said first reactor; and the at least one inlet circumferential flow apparatus and flow restricted exit portal of the second reactor configured to be provide mixing of a second gas within the second reactor upon introduction of said second gas through the at least one circumferential inlet gas flow apparatus into said second reactor; wherein the flow restricted exit portal of each reactor is connected in fluidic communication with the central reaction chamber; wherein electrodes of the first and second reactors are configured as a first and second electrode, respectively, capable of sustaining a high voltage electrical potential between the first and second electrodes; and wherein the non-thermal plasma reactor is capable of sustaining a non-thermal plasma between the first and second electrodes when energized.

Embodiment 3

The reactor assembly of embodiment 1 or 2 wherein each reactor further comprises an independent ignition electrode.

Embodiment 4

The reactor assembly of embodiment 1 or 2, wherein the flow restricted exit portal of each reactor is adapted to act as an ignition electrode.

Embodiment 5

The reactor assembly of any one of the preceding embodiments, wherein the first and second reactors are configured to eject a jet of non-thermal plasma into a common volume.

Embodiment 6

The reactor assembly of embodiment 2, wherein the first and second reactors are configured to eject a jet of non-thermal plasma into a common volume, said common volume located within the grounded central reaction chamber.

Embodiment 7

The reactor assembly of embodiment 5 or 6, wherein the residence of each of said plasma jets within said common volume gives rise to electrical communication between the reactor electrodes located within each of said reactors.

Embodiment 8

The reactor assembly of embodiment 1, wherein the at least two reactors are each configured with at least one circumferential inlet gas flow apparatus connected in fluidic communication to said each reactor.

Embodiment 9

The reactor assembly of any one of the preceding embodiments, wherein at least one of the at least two non-thermal plasma reactors are configured to provide a vortex flow of incoming gases.

Embodiment 10

The reactor assembly of embodiment 9 wherein the vortex flow of incoming gases is reverse vortex flow.

Embodiment 11

The reactor assembly of any one of the preceding embodiments, wherein at least one of the electrodes comprises stainless steel, copper or carbon.

Embodiment 12

The reactor assembly of any one of the preceding embodiments, wherein the non-thermal plasma is a gliding arc plasma.

Embodiment 13

The reactor assembly of any one of the preceding embodiments, wherein the high voltage electrical potential applied across the first and second reactor electrodes is in a range of from about 1 to about 20 kV.

Embodiment 14

The reactor assembly of any one of the preceding embodiments, wherein the non-thermal plasma is characterized as having an associated current in a range of about 0.1 to about 30 amps.

Embodiment 15

The reactor assembly of any one of embodiments 5 to 14, wherein the reactor is characterized by a plasma output power within the common volume in a range of about 1 kilowatt to about 500 kilowatts.

Embodiment 16

The reactor assembly of embodiment 15, wherein the output power within the common volume is greater than a plasma output power of any individual reactor.

Embodiment 17

The reactor assembly of embodiment 16, wherein the outlet power within the common volume is sufficient to (a) provide conversion of hydrocarbon fuel to syngas; (b) dissociation of carbon dioxide to carbon monoxide and oxygen; or (c) dissociation of hydrogen sulfide to hydrogen and sulfur.

Embodiment 18

The non-thermal plasma reactor assembly of any one of embodiments 2 to 17, which when operating, further comprises: (a) a gas flow into each of the first or second reactor through the respective at least one circumferential inlet gas flow apparatus; and (b) a non-thermal plasma across the first and second electrode and within the central reaction chamber.

Embodiment 19

The reactor assembly of any one of embodiments 2 to 18, wherein the feedstock comprises coal, municipal wastes, biomass, natural gas, carbon dioxide, hydrogen sulfide, hydrocarbon liquid waste, liquid fuel, or a combination thereof.

Embodiment 20

The reactor assembly of any one of embodiments 2 to 19, wherein the product comprises synthesis gas, comprising hydrogen, carbon monoxide, or a combination thereof. The product may additionally comprise carbon dioxide, nitrogen, light hydrocarbons, or a combination thereof.

Embodiment 21

The reactor assembly of any one of embodiments 2 to 20, wherein said apparatus for creating circumferential gas flow comprises a gas supply and one or more gas inlet nozzles oriented tangentially relative to a sidewall of the corresponding reactor.

Embodiment 22

The reactor assembly of any one of embodiments 2 to 21, wherein the first and second gas each independently comprises oxygen, air, hydrogen, methane, neutral gases, or a combination thereof.

Embodiment 23

The reactor assembly of any one of embodiments 2 to 22, wherein the flow restricted exit portals of the first and second reactors are axially directed into the central reaction chamber, each one of said exit portals being disposed at an angle with respect to one another.

Embodiment 24

The reactor assembly of any one of embodiments 2 to 23, further comprising at least one additional reactor, each additional reactor being electrically insulated from the central reaction chamber, said each reactor comprising: (i) an electrode; (ii) at least one circumferential inlet gas flow apparatus connected in fluidic communication with each said additional reactor; and (iii) a flow restricted exit portal, the inlet circumferential flow apparatus and flow restricted exit portal being configured to provide mixing of a gas within the additional reactor upon introduction of said gas through the at least one circumferential inlet gas flow apparatus into said additional reactor; and wherein the flow restricted exit portal of the additional reactor is connected in fluidic communication with the central reaction chamber; and wherein the electrode of said each reactor is configured to be operable in electrical series between the first and second electrodes.

Embodiment 25

The reactor assembly of embodiment 24, wherein each reactor further comprises an ignition electrode.

Embodiment 26

The reactor assembly of embodiment 25, wherein the flow restricted exit portal of each reactor is adapted to act as an ignition electrode.

Embodiment 27

The reactor assembly of any one of the preceding embodiments, further comprising an apparatus for applying a voltage difference between said first and second reactor electrodes.

Embodiment 28

A reactor assembly any one of embodiments 1 to 27, further comprising a power supply comprising: (a) at least two power supply modules, each module being capable of independently delivering power in a range of about 0.5 kW to about 10 kW; (b) a microprocessor unit which independently addresses and controls the energy output of each power supply module, in order to provide a predetermined duty cycle for the power supply; said power supply configured to maintain an overall delivered power to sustain a non-thermal plasma within the reactor assembly, with an associated current in a range of about 0.5 amps to about 30 amps.

Embodiment 29

A reactor assembly of any one of embodiments 1 to 28, further comprising: (a) at least two power supply modules, each module capable of independently delivering power in a range of about 0.5 kW to about 10 kW; (b) a microprocessor unit which independently addresses and controls the energy output of each power supply module so as to maintain a substantially equal duty cycle for each power supply module; said power supply configured to maintain an overall delivered power to sustain a non-thermal plasma within the reactor assembly while switching the modules in a predetermined order.

Embodiment 30

The reactor assembly of embodiment 29, wherein the power supply further comprises high voltage switching diodes, capable of switching each operational duty cycle in a predetermined order.

Embodiment 31

The reactor assembly of embodiment 29 or 30, wherein the switching frequency of each module is maintained in a range of about 1 to about 1000 kHz, but not less than the gliding arc frequency.

Embodiment 32

A method of operating the non-thermal plasma reactor assembly of any one of the preceding embodied reactor assemblies, comprising: (a) independently providing a gas to each of the first or second reactors; and (b) applying a high voltage electrical potential across the first and second reactor electrodes; and (c) igniting and sustaining non thermal plasma.

Embodiment 33

A method of operating the non-thermal plasma reactor assembly of any one of the preceding embodied reactor assemblies, comprising: (a) independently flowing a gas to each of the first or second reactors through the respective at least one inlet circumferential flow apparatus; and (b) applying a high voltage electrical potential across the first and second reactor electrode so as to sustain a non-thermal plasma; (c) contacting a feedstock with the non-thermal plasma.

Embodiment 34

A method of catalyzing a chemical reaction in a feedstock using a non-thermal plasma reactor assembly comprising using at least two non-thermal plasma reactors, each reactor comprising an electrode and configured to eject a jet of non-thermal plasma having an operating power external to said reactor; said at least two non-thermal plasma reactors configured to work in tandem with one another such that a first reactor electrode can be maintained at a high voltage electric potential relative to a second reactor electrode, said first and second reactor electrodes forming an electrode pair capable of maintaining a non-thermal plasma discharge between the first and second reactor electrodes; said method comprising: (a) independently providing a gas to each the first or second reactors; (b) applying a high voltage electrical potential across the first and second reactor electrodes, so as to sustain a non-thermal plasma is maintained; and (c) contacting the feedstock to the non-thermal plasma.

Embodiment 35

The method of embodiment 31 wherein the chemical reaction is conversion of hydrocarbon fuel to syngas, dissociation of carbon dioxide to carbon monoxide and oxygen, or dissociation of hydrogen sulfide to hydrogen and sulfur.

EXAMPLES

A test setup was assembled consisting of a dual jet gliding-arc plasmatron system, such as represented in FIG. 1, and using a modular design high voltage power supply as described herein. The non-thermal reactor system consisted of two identical gliding arc reactors with cylindrical, non-cooled electrodes. The reactors were connected serially: high voltage was supplied to the cathode of the first reactor and ground was connected to the anode of the second reactor. The power supply was designed to supply high voltage up to 2 kV, with a maximum power of about 12 kW. The power supply was designed as a switching mode electronic power supply based on pulse width modulation technology, consisting of several identical modules connected in parallel and regulated by control processor unit (CPU). The power supply provides negative polarity high voltage.

All described experiments were done using air at atmospheric conditions. To initiate the discharge an ignition electrode was used for each gap.

The results of operating the reactor assembly are shown in FIGS. 6(A-D). FIG. 6(A) shows Voltage-Current (V-I) characteristics of the power supply at different loads. At maximum load the power level provided by the power supply reached up to 10 kW.

Figure 6A:
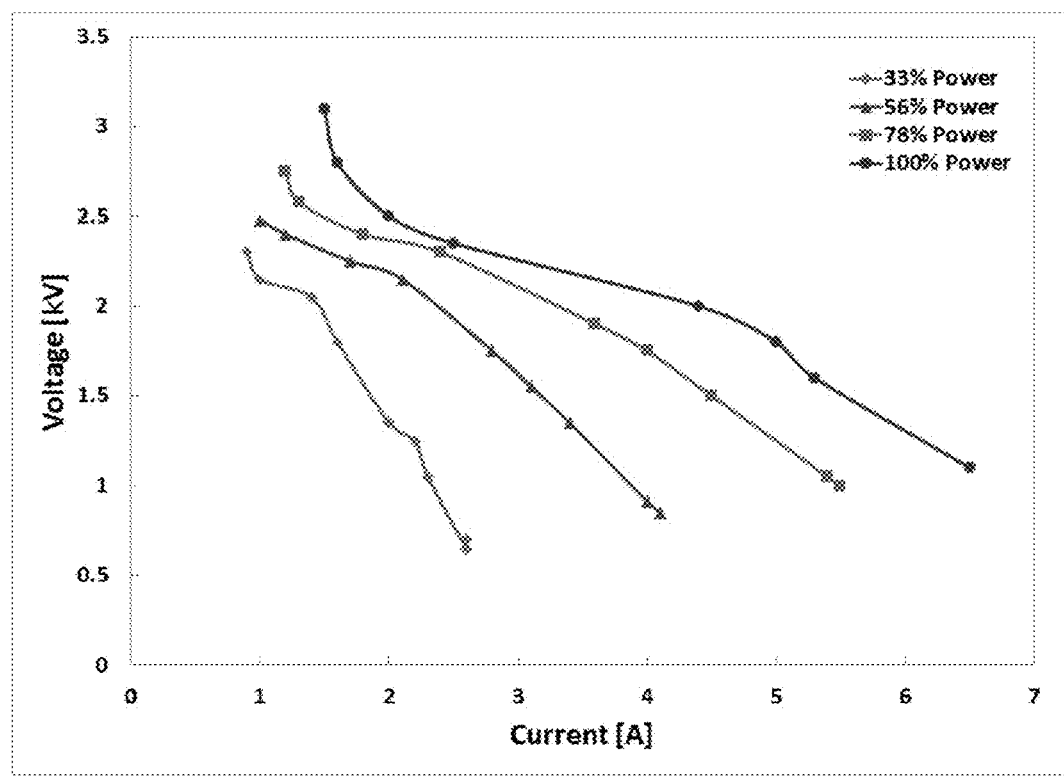
FIG. 6 provides data generated using the apparatus described in the Example section. The data of FIG. 6(A) show V-I characteristics of the power supply at different loads. The data of FIG. 6(B) show V-I characteristics of the reactor assembly for different air flow rates. The data of FIG. 6(C) show variations of the power as a function of the voltage for both power supply (solid lines) and reactor assembly (dashed lines). The data of FIG. 6(D) show variations of the power as a function of the current for both power supply (horizontal lines) and reactor assembly (vertical lines).
Figure 6B:
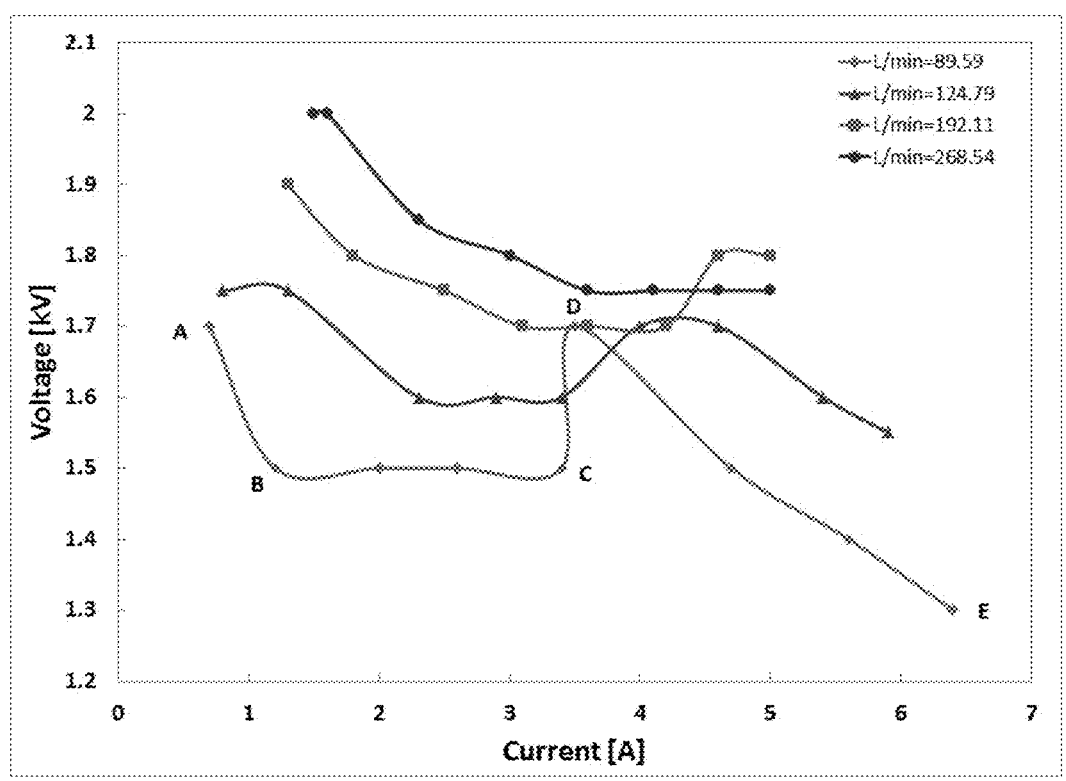

FIG. 6(B) presents V-I characteristics of the reactor system for different air flows. As the air flow increased, the voltage rose at the same current in comparison to lower air flow. Each curve can be divided into several regions which correspond to different operating modes of the reactor system. For example, the lower air flow (89.59 L/min) can be divided to 4 regions: AB, BC, CD and DE as denoted on FIG. 6(B). In the first region, AB, the voltage dropped when the current increased. This region corresponds to the stage where the arc from each reactor extended from the gap toward the electrode edge, but had not reached the edge yet. This regime is shown in FIG.

Figure 8A:
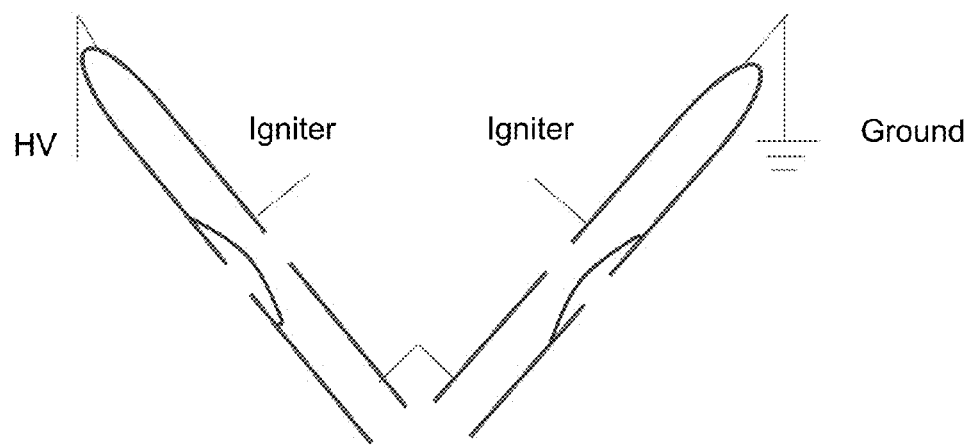
FIGS. 8(A), 8(B), and 8(C) illustrate the different stages of gliding arc development during the start-up and operation in a dual jet reactor system. The accompanying photographs illustrate plasma regimes associated with each stage. The exposure time of photographs in FIG. 8(A) and FIG. 8(B) was 1/8000 sec. See Examples for additional descriptions of these figures.
Figure 8A:
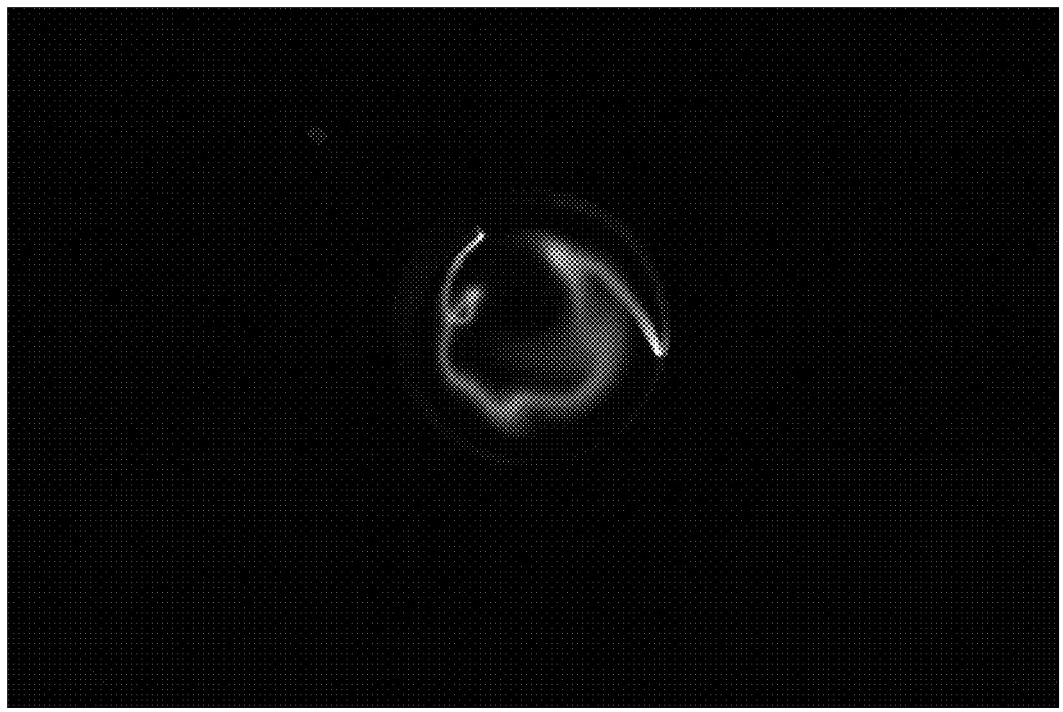
Figure 8B:
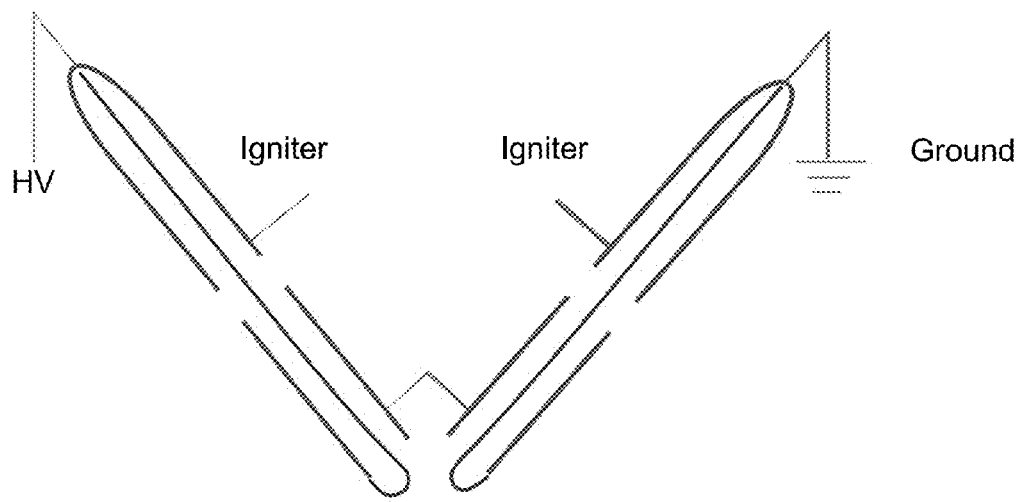
Figure 8B:
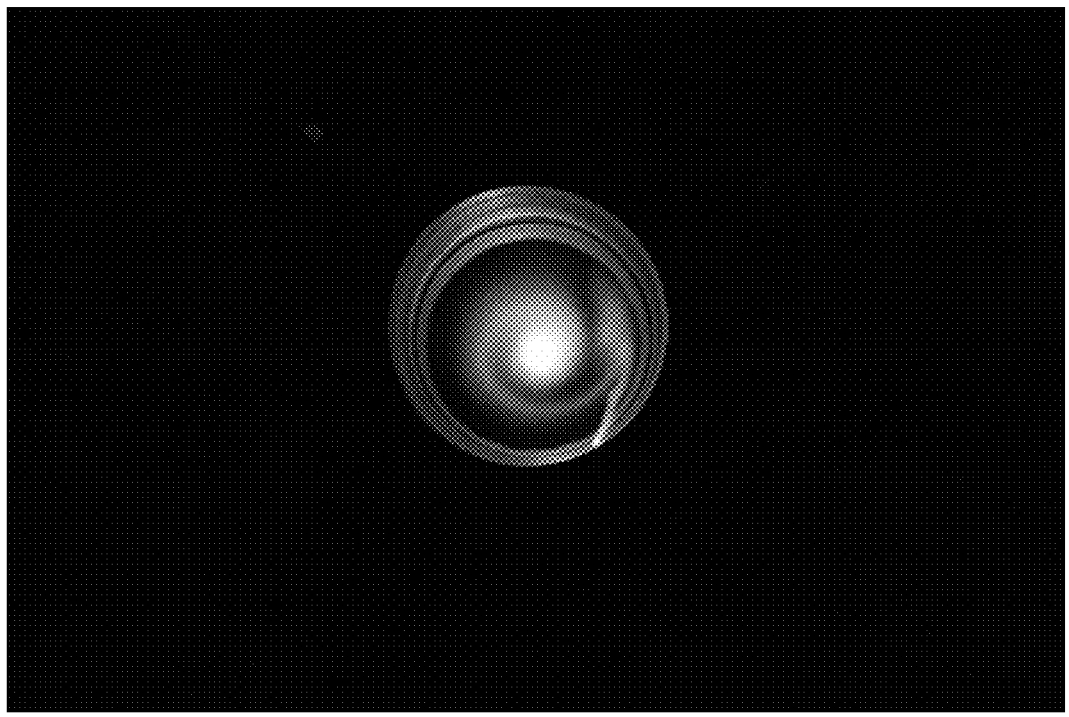
Figure 8C:
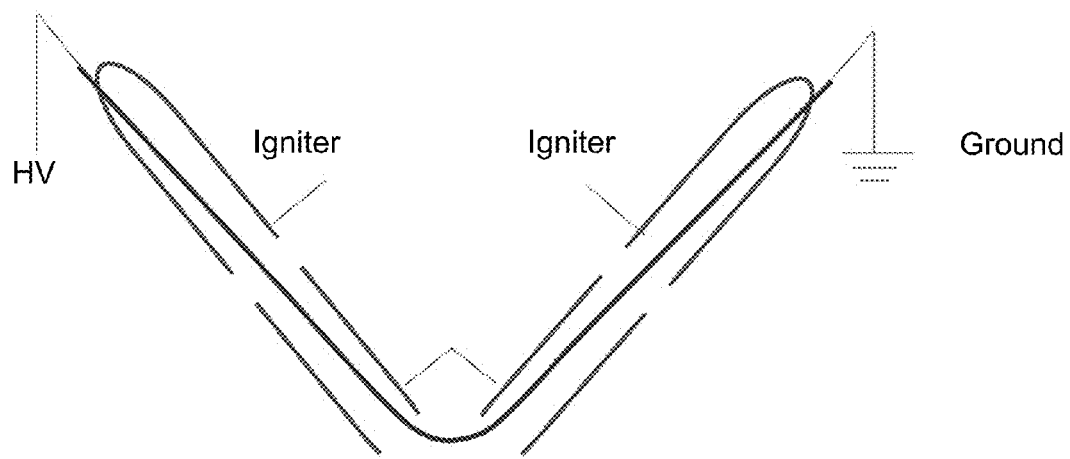
Figure 8C:
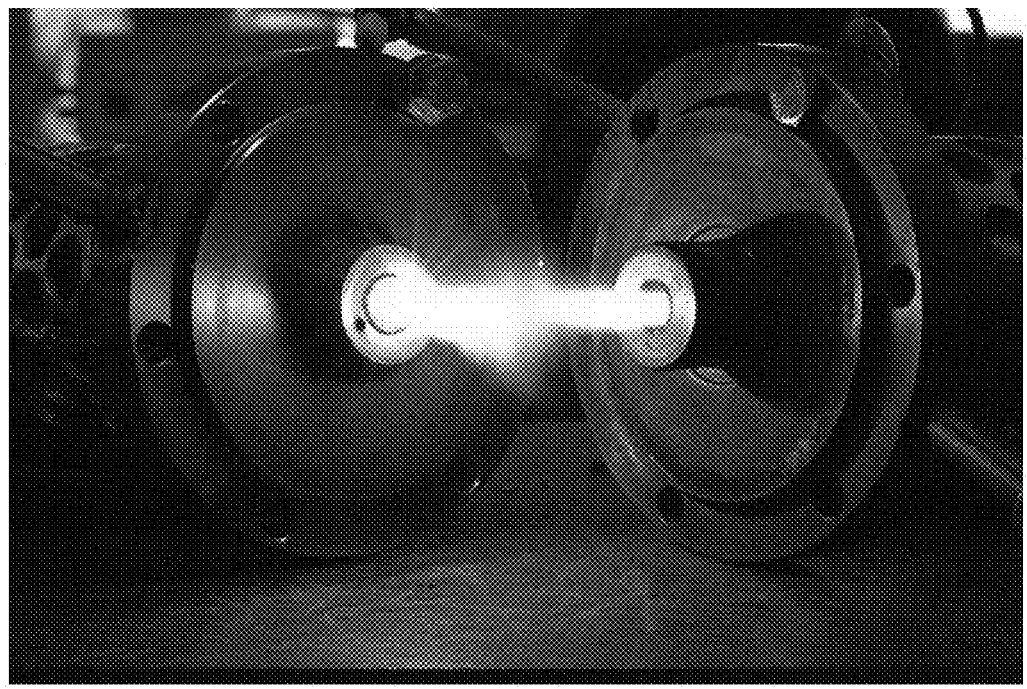

8(A). In the second region, BC, the voltage remained constant while current increased. In this region the gliding arc reached both ends of the electrodes and arc length remained relatively constant with a constant flow rate. In this region voltage remained constant during current increase that resulted in linear V-I characteristic. This region is shown in FIG. 8(B). In region CD the voltage sharply increased as the arcs began to merge, but remained unstable. Finally, both arcs merged and formed one joint arc as shown in FIG. 8(C) and this corresponds to region DE in FIG. 6(B).

Figure 6C:
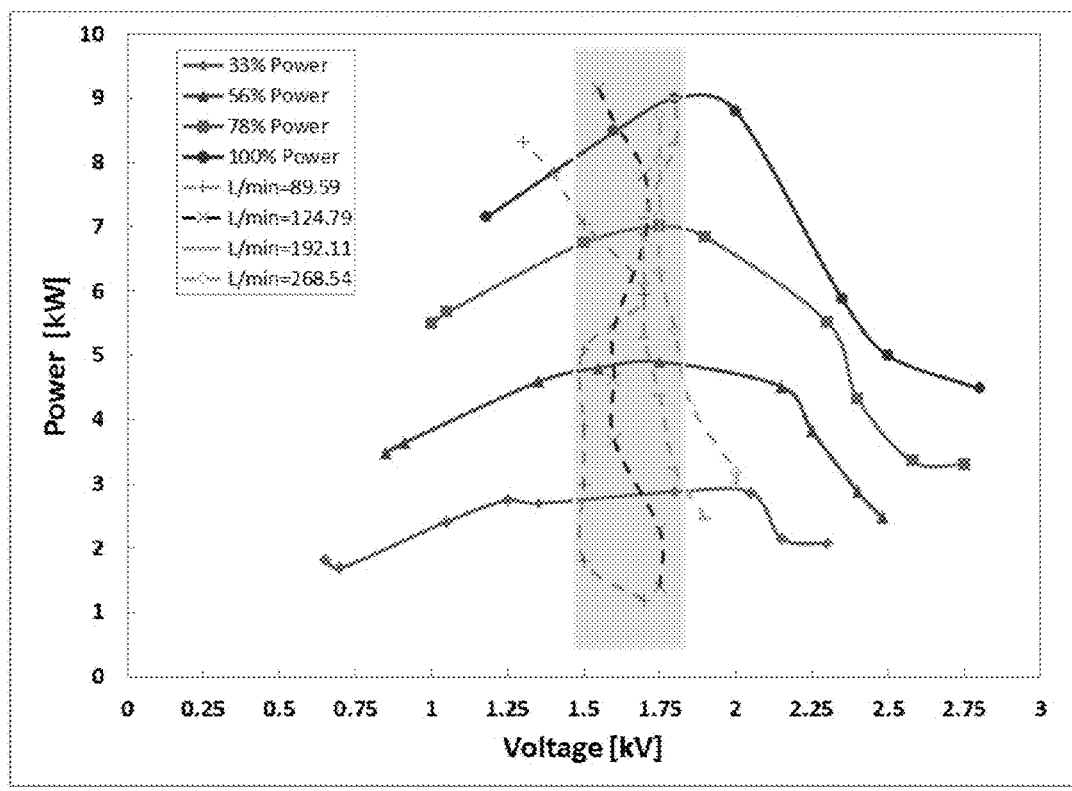

FIG. 6(C) demonstrates the power dependence on the voltage for the reactors (dash lines) and power supply (solid lines). The gray shaded area (voltage 1.5-1.7 kV) in FIG. 6(C) denotes working zone in the regime of high power (up to 9 kW). An air flow rate larger than 120 L/min was required for optimal power (9 kW). Lower flow shows lower voltage and results in instability.

Figure 6D:
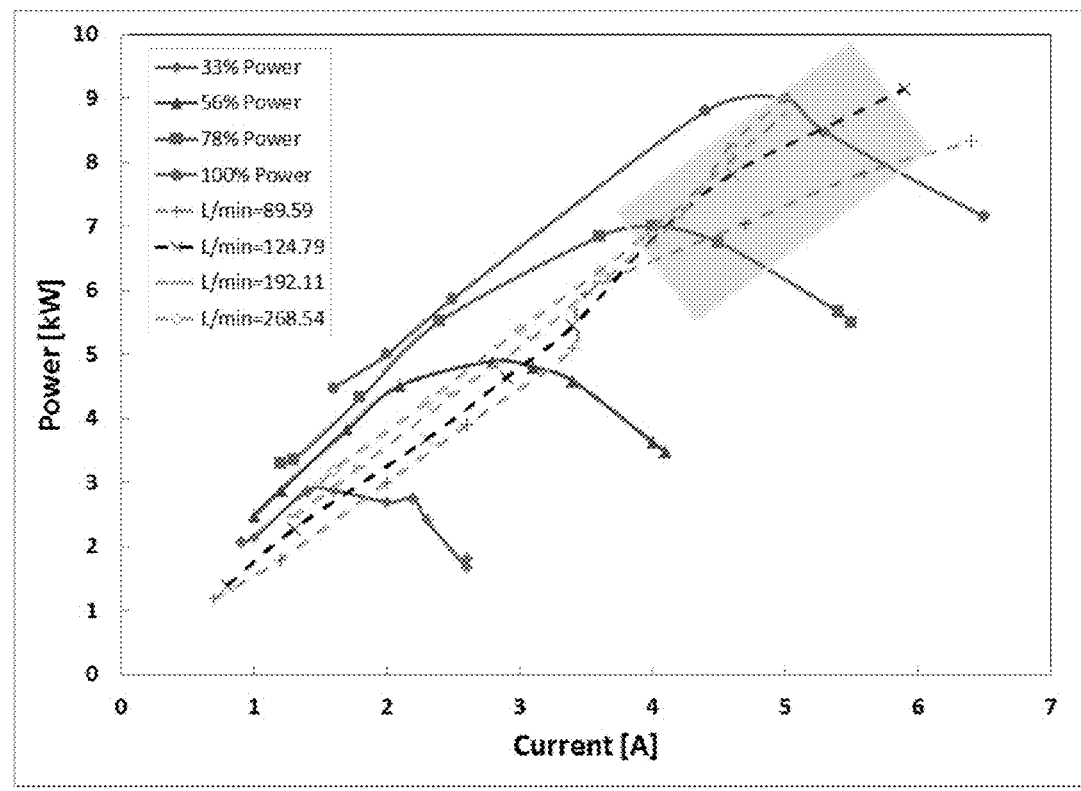

FIG. 6(D) shows power-current characteristics for the reactor (dash lines) and power supply (solid lines). The gray shaded area in the picture (current after 5 A) shows the zone of stable plasma system operation at maximum power.

These results reflect the successful implementation of an innovative system consisting of a dual-jet, gliding arc reactor and 10 kW power supply. The system was simple, robust, did not require liquid cooling and was able to operate stably at high power levels (9-12 kW) for long periods of time.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety.

What is claimed:

1. A non-thermal plasma reactor assembly comprising:
    (a) an electrically grounded central reaction chamber having at least one inlet for feedstock and at least one outlet for product;
    (b) at least two non-thermal plasma reactors, each reactor being electrically insulated from the central reaction chamber and comprising at least one inlet circumferential gas flow inlet apparatus, an electrode, and a flow restricted exit portal, the flow restricted exit portal of each reactor being connected in fluidic communication with the central reaction chamber, and each reactor configured to eject a jet of non-thermal plasma external to said reactor and into the central reaction chamber;
    the at least one inlet circumferential flow apparatus and flow restricted exit portal of a first of the at least two reactors configured to mix a first gas within the first reactor upon introduction of said first gas through the at least one circumferential inlet gas flow apparatus into said first reactor; and
    the at least one inlet circumferential flow apparatus and flow restricted exit portal of a second of the at least two reactors configured to be provide mixing of a second gas within the second reactor upon introduction of said second gas through the at least one circumferential inlet gas flow apparatus into said second reactor;
    the at least two non-thermal plasma reactors configured to work in tandem with one another such that the electrode of at least the first of the at least two reactors can be maintained at a high voltage electric potential relative to the electrode of the second of the at least two reactors, said first and second reactor electrodes forming an electrode pair capable of maintaining a non-thermal plasma discharge between the first and second reactor electrodes when energized.

2. The reactor assembly of claim 1 wherein each reactor further comprises an independent ignition electrode.

3. The reactor assembly of claim 1, wherein the flow restricted exit portal of each reactor is adapted to act as an ignition electrode.

4. The reactor assembly of claim 1, wherein the first and second reactors are configured to eject the jet of non-thermal plasma into a common volume, said common volume located within the grounded central reaction chamber.

5. The reactor assembly of claim 4, wherein the residence of each of said plasma jets within said common volume gives rise to electrical communication between the reactor electrodes located within each of said reactors.

6. The reactor assembly of claim 1, wherein at least one of the at least two non-thermal plasma reactors are configured to provide a vortex flow of incoming gases.

7. The reactor assembly of claim 6 wherein the vortex flow of incoming gases is reverse vortex flow.

8. The reactor assembly of claim 1, wherein at least one of the electrodes comprises stainless steel, copper or carbon.

9. The reactor assembly of claim 1, wherein the non-thermal plasma is a gliding arc plasma.

10. The reactor assembly of claim 1, wherein the high voltage electrical potential applied across the first and second reactor electrodes is in a range of from about 1 to about 20 kV.

11. The reactor assembly of claim 1, wherein the non-thermal plasma is characterized as having an associated current in a range of about 0.1 to about 30 amps.

12. The reactor assembly of claim 1, wherein the reactor is characterized by a plasma output power within the common volume in a range of about 1 kilowatt to about 500 kilowatts.

13. The reactor assembly of claim 12, wherein the output power within the common volume is greater than a plasma output power of any individual reactor.

14. The reactor assembly of claim 13, wherein the outlet power within the common volume is sufficient to provide conversion of hydrocarbon fuel to syngas, dissociation of carbon dioxide to carbon monoxide and oxygen, or dissociation of hydrogen sulfide to hydrogen and sulfur.

15. The non-thermal plasma reactor assembly of claim 1, which when operating, further comprises:
    (a) a gas flow into each of the first or second reactor through the respective at least one circumferential inlet gas flow apparatus; and
    (b) a non-thermal plasma across the first and second electrode and within the central reaction chamber.

16. The reactor assembly of claim 1, wherein the feedstock comprises coal, municipal wastes, biomass, natural gas, carbon dioxide, hydrogen sulfide, hydrocarbon liquid waste, liquid fuel, or a combination thereof.

17. The reactor assembly of claim 1, wherein the product comprises synthesis gas comprising hydrogen and carbon monoxide.

18. The reactor assembly of claim 1, wherein said apparatus for creating circumferential gas flow comprises a gas supply and one or more gas inlet nozzles oriented tangentially relative to a sidewall of the corresponding reactor.

19. The reactor assembly of claim 1, wherein the first and second gas each independently comprises oxygen, air, hydrogen, methane, neutral gases, or a combination thereof.

20. The reactor assembly of claim 1, wherein the flow restricted exit portals of the first and second reactors are axially directed into the central reaction chamber, each one of said exit portals being disposed at an angle with respect to one another.

21. The reactor assembly of claim 1, comprising three or more non-plasma reactors, each additional reactor being electrically insulated from the central reaction chamber, said each reactor comprising:
  (i) an electrode;
  (ii) at least one circumferential inlet gas flow apparatus connected in fluidic communication with said additional reactor; and
  (iii) a flow restricted exit portal,
  the inlet circumferential flow apparatus and flow restricted exit portal configured to be providing mixing of a gas within the additional reactor upon introduction of said gas through the at least one circumferential inlet gas flow apparatus into said additional reactor; and
  wherein the flow restricted exit portal of the additional reactor is connected in fluidic communication with the central reaction chamber; and
  wherein the electrode of said each additional reactor beyond two is configured to be operable in electrical series between the first and second electrodes when energized with plasma.

22. The reactor assembly of claim 21, wherein each reactor further comprises an ignition electrode.

23. The reactor assembly of claim 22, wherein the flow restricted exit portal of each reactor is adapted to act as an ignition electrode.

24. The reactor assembly of claim 21, further comprising an apparatus for applying a voltage difference between said first and second reactor electrodes.

25. A reactor assembly of claim 1, further comprising a power supply comprising:
  (a) at least two power supply modules, each module being capable of independently delivering power in a range of about 0.5 kW to about 10 kW;
  (b) a microprocessor unit which independently addresses and controls the energy output of each power supply module, in order to provide a predetermined duty cycle for the power supply; said power supply configured to maintain an overall delivered power to sustain a non-thermal plasma within the reactor assembly, with an associated current in a range of about 0.5 amps to about 30 amps.

26. The reactor assembly of claim 1, further comprising: (a) at least two power supply modules, each module capable of independently delivering power in a range of about 0.5 kW to about 10 kW; (b) a microprocessor unit which independently addresses and controls the energy output of each power supply module so as to maintain a substantially equal duty cycle for each power supply module; said power supply configured to maintain an overall delivered power to sustain a non-thermal plasma within the reactor assembly while switching the modules in a predetermined order.

27. The reactor assembly of claim 26, wherein the power supply further comprises high voltage switching diodes, capable of switching each operational duty cycle in a predetermined order.

28. The reactor assembly of claim 26, wherein the switching frequency of each module is maintained in a range not less than the gliding arc frequency.

29. A method of operating the non-thermal plasma reactor assembly of claim 1, comprising:
  (a) independently providing a gas to each of the first or second reactors; and
  (b) applying the high voltage electrical potential across the first and second reactor electrodes; and
  (c) igniting and sustaining the non-thermal plasma.

30. A method of operating the non-thermal plasma reactor assembly of claim 1, comprising:
  (a) independently flowing a gas to each of the first or second reactors through the respective at least one inlet circumferential flow apparatus; and
  (b) applying the high voltage electrical potential across the first and second reactor electrode so as to sustain the non-thermal plasma;
  (c) contacting a feedstock with the non-thermal plasma.

31. A method of catalyzing a chemical reaction in a feedstock using the non-thermal plasma reactor assembly of claim 1, said method comprising:
  (a) independently providing a gas to each the first or second reactors;
  (b) applying the high voltage electrical potential across the first and second reactor electrodes, so as to sustain the non-thermal plasma; and
  (c) contacting the feedstock to the non-thermal plasma.

32. The method of claim 31 wherein the chemical reaction is conversion of hydrocarbon fuel to syngas, dissociation of carbon dioxide to carbon monoxide and oxygen, or dissociation of hydrogen sulfide to hydrogen and sulfur.

* * * * *